United States Patent [19]

Kei et al.

[11] Patent Number: 5,081,183
[45] Date of Patent: Jan. 14, 1992

[54] POLY(ALPHA-KETOESTER) COMPOUND AND PRODUCTION THEREOF

[75] Inventors: Aoki Kei, Ikoma; Takagawa Ryozo, Toyonaka; Tomita Nobuaki, Nara; Mori Hirohiko, Settsu, all of Japan

[73] Assignee: Nippon Paint Co., Ltd., Osaka, Japan

[21] Appl. No.: 464,120

[22] Filed: Jan. 12, 1990

[30] Foreign Application Priority Data

Jan. 12, 1989 [JP] Japan .................. 1-7032
Dec. 7, 1989 [JP] Japan ................ 1-318505

[51] Int. Cl.$^5$ .............. C08F 8/00; C08L 29/02; C08L 33/14; C08L 29/00
[52] U.S. Cl. ..................... 525/61; 525/118; 525/213; 525/217; 525/219; 525/226; 525/328.2; 525/328.8; 525/328.9; 525/331.4; 525/333.2; 525/359.1; 525/386
[58] Field of Search ............ 525/56, 61; 560/204; 514/232.2

[56] References Cited

U.S. PATENT DOCUMENTS 4,105,765 8/1978 Kummer et al. .............. 514/232.2

OTHER PUBLICATIONS

W. Von E. Doering and Lillian K. Levy, d-Orbital Resonance I. The Acidity of Bridgehead α-Hydrogen in a Bicyclic Trisulfone, Journal of the American Chemical Society 77, 509, 1955 (see p. 512).
Donald J. Cram and George S. Hammond, Organic Chemistry, McGraw-Hill Book Company, Inc., 1959 (see p. 310).
K. C. Gupta and K. K. Sharma, Polarographic Study of Mixed Ligand (Trimethylolpropane Trithioglycolate-Oxalate-Citrate-Tartrate-Glutamate) Complexes of Cadmium (II), Lead (II) and Thallium (I), An. Quim., Ser. B, 82(2), 118-23, 1986 Abstract of R. CA 106 (8): 56629m, 1986.

Primary Examiner—Joseph L. Schofer
Assistant Examiner—Wu C. Cheng
Attorney, Agent, or Firm—Wegner, Cantor, Mueller & Player

[57] ABSTRACT

The present invention provides a poly(alpha-ketoester) compound represented by the formula (1);

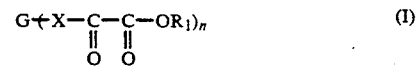

wherein G is a residue of an active hydrogen-containing compound G—(X—H)$_n$, or an alkyl, aryl, aralkyl, alkenyl, alkynyl group having 3 to 20 carbon atoms which may contain oxygen or nitrogen atoms, or a polymeric compound residue, X is an oxygen atom or —CH$_2$, n is an integer of 3 to 1,000, R$_1$ is a hydrogen atom, a C$_1$–C$_5$ alkyl group or an aryl group, and a production thereof.

18 Claims, No Drawings

POLY(ALPHA-KETOESTER) COMPOUND AND PRODUCTION THEREOF

FIELD OF THE INVENTION

The present invention relates to a novel poly(alpha-ketoester) compound and a method for producing the same.

BACKGROUND OF THE INVENTION

It has been known that an alpha-ketoester group

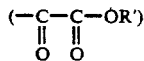

is a chemically active group which can be ester-exchanged with an active hydrogen containing-compound, such as an alcohol or an amine, or can be easily hydrolyzed.

The present inventors synthesize a compound having at least two alpha-ketoester groups.

SUMMARY OF THE INVENTION

The present invention provides a poly(alpha-ketoester) compound represented by the formula (I);

$$G + X - C - C - OR_1)_n \quad (I)$$
$$\phantom{G + X -} \| \ \|$$
$$\phantom{G + X -} O \ O$$

wherein G is a residue of an active hydrogen-containing compound $G-(X-H)_n$, or an alkyl, aryl, aralkyl, alkenyl, alkynyl group having 3 to 20 carbon atoms which may contain an oxygen or nitrogen atom, or a polymeric compound residue, X is a oxygen atom or $-CH_2-$, n is an integer of 3 to 1,000, $R_1$ is a hydrogen atom, a $C_1-C_5$ alkyl group or an aryl group.

The present invention also provides a method for producing the above mentioned poly(alpha-ketoester) groups.

Further, the present invention provides a curable composition which contains the poly(alpha-ketoester) compound as curing agent.

DETAILED DESCRIPTION OF THE INVENTION

The poly(alpha-ketoester) compound can be prepared by reacting an active hydrogen-containing compound (II);

$$G-(-X-H)_n \quad (II)$$

[wherein G, X and n is the same as mentioned above.] with an ester compound (III);

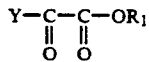

[wherein Y is a halogen atom or $R_1O$, $R_1$ is the same as mentioned above].

The active hydrogen-containing compound (II) is a compound which has at least three hydroxyl groups. The compound can be either low molecular weight or high molecular weight. It includes polyhydric alcohols, polyester polyols, polyether polyols, polyurethane polyols, polyvinyl alcohols, phenol resins, hydroxyl-containing polybutadine, hydroxyl-containing poly-chloroprene, ring-opened epoxy resins, amino resins and the like.

Typical examples of the polyhydric alcohols are glycerol, trimethylolpropane, 1,2,4-butanetriol, cyclohexanetriol, cyclohexanetrimethylol, pentaerythritol, dispentaerythritol, amylose, lactose, sucrose, manitol, maltose and the like.

Typical examples of the polyester polyols are a condensate of a polyhydric alcohol as mentioned above and a polybasic acid or an anhydride thereof (e.g. phthalic acid, tetrahydrophthalic acid, tetrachlorophthalic acid, hexahydrophthalic acid, succinic acid, maleic acid, fumaric acid, adipic acid, sebacic acid, trimellitic acid, pyromellitic acid etc.); a reaction product of a polyhydric alcohol as mentioned above with an epoxy compound (e.g. n-butyl glycidyl ether, allyl glycidyl ether, Cardura E available from Yuka Shell Company etc.); an alkyd polyol (a product of a polyhydric alcohol and oil (e.g. soybean oil and safflower oil)); a ring open product of e-caprolantone; and the like.

Examples of the polyether polyols are an adduct of a polyhydric alcohol as mentioned above and an alkylene oxide (e.g. ethylene oxide, propylene oxide, tetrahydrofuran etch) and the like.

The polyurethane polyol may be prepared by reacting a polyol as mentioned above and a polyisocyanate compound. Examples of the polyisocyanate compounds are ethylene diisocyanate, propylene diisocyanate, tetramethylene diisocyanate, hexamethylene diisocyanate, 1-methyl-2,4-diisocyanatocyclohexane, 1-methyl-2,6-diisocyanatocyclohexane, diisocyanatodimethylxylene, diisocyanatodiethylxylene, lysine diisocyanate, 4,4'-methylenebis(cyclohexylisocyanate), 4,4'-ethylenebis(cyclohexylisocyanate), alpha, alpha'-diisocyanato-1,3-dimethylbenzene, alpha, alpha'-diisocyanato-1,4-dimethylbenzene, isophorone diisocyanate, 2,4-tolylene diisocyanate, 2,6-tolylene diisocyanate, 1,5-naphthylene diisocyanate, 4,4'-methylenebis(phenyleneisocyanate), triphenylmethane triisocyanate and a polymer thereof. The polyol for the polyurethane polyol may be polymeric polyol, such as polyether polyol or polyester polyol.

Examples of the phenol resins are a novolac or resol type phenol resin, rosin modified phenol resin, alkylphenol resin, butylated resol resin, allyl ether resol resin and the like.

Examples of the amino resins are melamine, guanamine, a reaction product of urea and formaldehyde and the like.

The ester compound (III) employed in the present invention includes oxalic diesters, such as dimethyl oxalate, diethyl oxalate, diisopropyl oxalate, dibutyl oxalate, diphenyl oxalate etc.; alkoxalyl halides, such as methoxalyl chloride, ethoxalyl chloride, etc.

If the ester compound (III) is the alkoxalyl halide (Y is halogen), the reaction between the compound (III) and the compound (II) is a dehydrohalogenation reaction which quantitatively progresses. The reaction may be carried out at $-20°$ to $150°$ C., preferably $0°$ to $50°$ C. in an inert solvent. Examples of the inert solvents are aliphatic hydrocarbons, such as pentane, hexane and heptane; aromatic hydrocarbons, such as benzene, toluene and xylene; cycloaliphatic hydrocarbons, such as cyclohexane, methylcyclohexane and decalin; petroleum hydrocarbons, such as petroleum ether and petroleum benzine; halogenated hydrocarbons, such as carbon tetrachloride, chloroform, 1,2-dichloroethane;

ethers, such as ethyl ether, isopropyl ether, anisol, dioxane and tetrahydrofuran; ketones, such as acetone, methyl ethyl ketone, cyclohexanone, acetophenone and isophorone; esters, such as ethyl acetate, butyl acetate, propyleneglycol monoethyl ether acetate and ethyleneglycol monoethyl ether acetate; acetonitrile; dimethylformamide; dimethylsulfoxide; and the like. Removal of the byproduct hydrogen chloride may be carried out by a method wherein nitrogen gas is blown into the reaction vessel, or a method wherein hydrogen chloride is reacted with a tertiary amine to form a salt of HCl which is removed.

If the compound (III) is the oxalic diester (Y is $-OR_1$), the reaction between the compound (III) and the compound (II) is an ester exchange reaction which is generally carried out using a large excess of dialkyl oxalate in the presence of a catalyst. The amount of the dialkyl oxalate is 2 to 20 times, preferably 3 to 8 times larger than the molar amount of the compound (II) and the reaction temperature is within the range of $-20°$ to $150°$ C., preferably $0°$ to $50°$ C. The reaction may be carried out in an inert solvent as mentioned above. Typical examples of the catalysts are tin compounds, such as dibutyltin dilaurate, dibutyltin oxide and monobutyltin triheptate; mixture catalysts, such as dimethyltin diiodide and tetraphenylantimony iodide, dimethyltin diiodide and hexamethyl phosphoric triamide; acidic compounds, such as p-toluenesulfonic acid, dodecylbenzenesulfonic acid, sulfuric acid, chloric acid, nitric acid and boron trichloride etherate; basic compounds, such as triethylamine, 1,4-diazabicyclo[2,2,-2]octane, 1,8-diazabicyclo[5,4,0]undecene-7, pyridine sodium methoxide, sodium ethoxide and t-butoxypotassium hexamethylphosphoric triamide; metal oxides or metal salts, such as manganese acetate, cobalt acetate, calcium acetate, lithium acetate, zinc acetate, magnesium acetate, antimony trioxide, lead dioxide, ferric chloride, aluminum triisopropoxide and tetraisopropoxy titanium; and the like.

The obtained product may be purified by distillation, chromatography etc. Distillation is generally effected at a reduced pressure (atmospheric pressure to 0.01 mmHg) at a temperature of room temperature to $180°$ C., preferably $50°$ to $120°$ C. in the presence of zeolite or with stirring.

The obtained product is generally liquid or oil and its yield is more than 70%.

Since the poly(alpha-ketoester) compound of the present invention has plural alpha-ketoester groups which makes it very active, it is applicable to paint, adhesive, electronic material, molding, plastics and the like. The compound may be combined with a polyol to form a curable composition which is very suitable for coating or adhesive.

If the poly(alpha-ketoester) compound of the present invention is combined with a compound having plural active hydrogens, especially a polyhydroxyl compound, to obtain a curable composition, the cured article has excellent physical properties in acid resistance and low temperature curing properties. Examples of the polyhydroxyl compounds are polyhydric alcohol, acryl polyol, polyester polyol, polyether polyol, polyurethane polyol, polyvinyl alcohol, phenol resin, polyhydroxyl-containing butadiene or polychloroprene, ring opened epoxy resin and polyorganopolysiloxane polyol. These polyhydroxyl compound are the same as listed above in the active hydrogen-containing compound (II), but may include diols and acryl polyol. Typical examples of the diols are 3-allyloxy-1,2-propane diol, 2,2-bis(chloromethyl)-1,3-propane diol, 2-bromo-2-nitro-1,3-propane diol, 3-bromo-1,2-propane diol, butane diol, butyne diol, cyclohexane diol, cyclooctane diol, cyclopentane diol, decalin diol, decane diol, ethylene glycol, propylene glycol, dihydroxyacetophenone, dihydroxyanthraquinone, dihydroxybenzophenone, hydroxybenzylalcohol, catechol and the like. The acryl polyol is a polymer of a hydroxyl containing ethylenically unsaturated monomer. Examples of the hydroxyl containing unsaturated monomers are 2-hydroxyethyl (meth)acrylate, 2-hydroxypropyl (meth)acrylate, 2-hydroxybutyl (meth)acrylate and the like. The acryl polyol may be a copolymer of the above mentioned monomers with other monomers. Examples of the other monomers are methyl (meth)acrylate, ethyl (meth)acrylate, n-butyl (meth)acrylate, isobutyl (meth)acrylate, ethylhexyl (meth)acrylate, alpha-methylstyrene, vinyltoluene, t-butylstyrene, ethylene, propylene, vinyl acetate, vinyl propionate, acrylonitrile, methacrylonitrile, dimethylaminoethyl (meth)acrylate, and the like.

The curable composition of the present invention may generally contain a catalyst as mentioned in the synthesis of the poly(alpha-ketoester) compound. The catalyst may be present in the composition in an amount of 0.0001 to 10% by weight, preferably 0.001 to 5% by weight based on the total amount of the poly(alpha-ketoester) and the polyhydroxyl compound.

The curable composition may contain a solvent if necessary. The solvent can be the inert solvent as mentioned above, but alcohols (e.g. ethylene glycol, 2-ethylhexanol, t-butanol, n-hexanol, n-butanol, cyclohexanol, isopropanol, n-propanol, benzyl alcohol, ethanol, methanol etc.) may be employed. The solvent may be present in the composition in an amount of 0.01 to 90% by weight, preferably 0.5 to 80% by weight, but alcohols are preferably less than 50% by weight because they are ester-exchanged with alkoxalyl ester.

The curable composition may be cured at a temperature of $70°$ to $200°$ C., preferably $90°$ to $180°$ C. for 5 minutes to 2 hours, preferably 10 minutes to one hour.

EXAMPLES

The present invention is illustrated by the following Examples which, however, are not construed as limiting the present invention to their details.

EXAMPLE 1

Preparation of triethoxalyltrimethylolpropane

To a 100 liter three neck flask was added 40 ml of tetrahydrofuran, 1,53 g (11 mmol) of trimethylolpropane and 3.46 g (51 mmol) of triethylamine, and cooled with ice. With stirring, 20 ml of a tetrahydrofuran solution of 4.68 g (51 mmol) of ethoxalyl chloride was added over 1 hour. After mixing at room temperature for 2 hours, a solution of 2.34 g (17 mmol) of ethoxalyl chloride in 15 ml of tetrahydrofuran was further added for 15 minutes and mixed at room temperature for 15 minutes.

The deposited salt was filtered and condensed, and subjected to distillation with a Kugel distillation apparatus to obtain 2.19 g (yield 44%) of the aimed compound. Physical properties of the compound are as follow;

| Boiling point | 215° C./0.04 mmHg |
|---|---|
| $^{13}$C-NMR | a; 7.10, h; 13.70, b; 22.78, c; 41.00, g; 63.14, d; 65.70, f; |

-continued

IR spectrum
156.66, e; 157.19
3000 (CH)
1750, 1780 (C=O)
1160, 1180 (C—O)

$$CH_3-CH_2-C(CH_2-OCCOCH_2CH_3)_3$$
$$\phantom{CH_3-C}\overset{\overset{O\;O}{\|\;\|}}{\phantom{X}}$$
a  b  c d  e f  g  h

EXAMPLE 2

Preparation of triethoxalyltrimethylolpropane

A reaction vessel equipped with a stirrer, a condenser and a decanter was charged with 500 g (3.42 mol) of diethyl oxalate, 31.3 g (0.23 mol) of trimethylolpropane and 1 g (0.0053 mol) of p-toluenesulfonic acid monohydrate, and mixed at 130° C. for 5 hours. After removing 32.3 g of ethanol, it was then cooled and excess amount of diethyl oxalate was evaporated to obtain 106.1 g of crude triethoxalyltrimethylolpropane (yield 85%).

EXAMPLE 3

Preparation of triethoxalyltrimethylolpropane

A reaction vessel equipped with a stirrer, a condenser and a decanter was charged with 743.1 g (5 mol) of diethyl oxalate, 56.9 g (0.42 mol) of trimethylolpropane and 0.55 g (0.8 mmol) of dibutyltin dilaurate, and mixed at 130° C. for 5 hours. After removing 58.6 g of ethanol, it was then cooled and excess amount of diethyl oxalate was evaporated to obtain 158.7 g of crude triethoxalyltrimethylolpropane (yield 87%).

EXAMPLE 4

Preparation of tetraethoxalylpentaerythritol

A reaction vessel was charged with 40 ml of tetrahydrofuran, 1.36 g (0.01 mol) of pentaerythritol and 6.06 g (0.06 mol) of triethylamine, and cooled with ice. To the mixture was added dropwise 8.19 g (0.06 mol) of ethoxalyl chloride for one hour. It was refluxed for 6 hours to terminate reaction. Then, the solvent was removed to obtain 5.0 g of crude product. The crude product was subjected to column chromatography (hexane/ethyl acetate=1/1 (v/v)) to obtain 2.5 g of the aminated compound (yield 46.3%).

$$C(CH_2-O-\overset{\overset{O\;O}{\|\;\|}}{CC}-O-CH_2CH_3)_4$$
a  b   c d   e  f

| | |
|---|---|
| $^{13}$C-NMR | f; 13.85, a; 42.45, e; 63.52, b; 63.92, d; 156.60, c; 156.94 |
| IR spectrum | 3000 (CH) |
| | 1740, 1760 (C=O) |
| | 1155, 1195 (C—O) |

EXAMPLE 5

Synthesis was conducted as generally described in Example 3, with the exception that 42.4 g (0.167 mol) of dipentaerythritol was employed instead of 56.9 g of trimethylolpropane to obtain 128.4 g of crude hexaethoxalyldipentaerythritol (yield 90%).

REFERENCE EXAMPLE 1

Preparation of ethoxalyl modified polyester resin

A reaction flask equipped with a heater, a stirrer, a condenser, a water separator, a fractionating column and a thermometer was charged with 386 parts by weight of trimethylolpropane, 312 parts by weight of neopentyl glycol, 350 parts by weight of neopentylglycol pivalate, 160 parts by weight of adipic acid, 730 parts by weight of isophthalic acid and 0.4 parts by weight of dibutyltin dilaurate, and dissolved at 80° to 100° C. When it was liquefied, mixing started and it was heated to 160° C. It was then heated slowly to 220° C. for three hours with removing water. At 220° C., reaction was continued for 2 hours. Then, xylene was added thereto and reaction was continued with refluxing xylene. Reaction was terminated when acid value was 14.0, and cooled. After cooling, 600 parts by weight of xylene was added to form a polyester resin varnish A. The varnish had a solid content of 79.9%, a viscosity of XY and an acid value of 9.9.

EXAMPLE 6

A reaction vessel equipped with a heater, a stirrer, a reflux apparatus, a decanter and a thermometer was charged with 814 parts by weight of the polyester resin varnish of Reference Example 1, 1426 parts by weight of diethyl oxalate and 13 parts by weight of dibutyltin dilaurate, and heated to 130° C. for 30 minutes. At 130° C., reaction was continued as removing producing ethanol. Reaction was terminated when the absorption peak of a hydroxyl group disappeared by IR spectrum, and cooled to 50° C. It was then heated to 100° C., and remaining diethyl oxalate and xylene were removed under vacuum to obtain a diethyl oxalate-modified polyester resin B. The resin had a viscosity of 690 poise at 25° C. by E type viscometer.

EXAMPLE 7

A resin composition was prepared by mixing 1.34 g of triethoxalyltrimethylolpropane of Example 1, 8.66 g of the acryl polyol of Reference Example 2 and 1 wt % / solid content of dibutyltin laurate. It was coated on a tin plate by a bar coater at a thickness of 20 microns. The coating was baked at four different temperatures and curing properties were evaluated. The result is shown in Table 1. This shows that the combination of the ethoxalyltrimethylolpropane and an acryl polyol provides excellent curing properties.

TABLE 1

| Number[1] | Curing temp. (°C.) | Nonvolatile content[2] (%) | Gellation %[3] |
|---|---|---|---|
| 1 | 110 | 96.4 | 80.5 |
| 2 | | 96.3 | 81.6 |
| 1 | 130 | 94.8 | 93.6 |
| 2 | | 95.0 | 94.2 |
| 1 | 150 | 94.0 | 95.6 |
| 2 | | 94.3 | 96.0 |
| 1 | 180 | 91.8 | 97.0 |
| 2 | | 92.2 | 97.4 |

[1] Number of times for test.
[2] Nonvolatile content = $W_1/W_2$ wherein $W_1$ is weight of the coated film after baking, and $W_2$ is weight of the coated film which is dried at 3 mmHg for 24 hours.
[3] Gellation %; The coated film was placed in an acetone refluxing condition for three hours and then dried at 60° C. for 5 hours. The remaining film is expressed with percentage.

REFERENCE EXAMPLE 2

Preparation of an acryl polyol

A one liter reaction vessel equipped with a decanter, a condenser, a stirrer and a dropping funnel was charged with 180 g of butyl acetate and heated to 120° C. The following monomers were added over 3 hours from the dropping funnel; 142.7 g of methyl methacrylate, 87.7 g of n-butyl acrylate, 69.6 g of 2-hydroxyethyl methacrylate and 4.5 g (1.5 wt % / monomers) of azobisisobutylonitrile. and 30 g of butyl acetate were added and then mixed for 1.5 hours. After cooling, a transparent light yellow polymer was obtained. It had Mn 8870, hydroyl value 100, Mw 20,600 and $\alpha$ 2.31.

REFERENCE EXAMPLE 3

Preparation of an acryl polyol

A 200 ml flask equipped with a decanter, a condenser, a stirrer and a dropping funnel was charged with 21.8 g of xylene and heated to 135° C. The following mixture was added dropwise for three hours; 6.3 g of a curing agent (Kaya ester O available from Akzo Chemical Company), 6.3 g of xylene and a monomer mixture of FM-2 (a compound prepared by ring-opened 2-hydroxyethyl methacrylate with ε-caprolactone; available from Daisel Chemical Industries Co., Ltd.)/styrene/isobutyl methacrylate/alpha-methylstyrene dimer (55.2/10.2/27.4/10.2 weight ratio). After mixing for 5 hours, 5.0 g of xylene and 0.63 g of Kaya ester O were added dropwise for one hour. After the completion of dropping, mixing was continued for 1.5 hours and the product heated to remove 15 g of xylene. It was then cooled to room temperature to obtain a transparent light yellow resin. It had a viscosity of 3.26 cps at 25° C. by and E type viscometer. The resin had a nonvolatile content of 70% at 130° C. for 30 minutes.

EXAMPLE 8

Triethoxalyltrimethylolpropane (TETMP) and the acryl polyol were mixed with 1 wt % / solid content of dibutyltin dilaurate. The resultant composition was coated on a tin plate by a bar coater no. 40, and then baked at 130° or 150° C. for three minutes. Curing properties were evaluated and the results were shown in Table 2.

The same test as mentioned above was effected with the exception that hexaethoxalyldipentaerythritol (HEODPE) of Example 5 was employed instead of triethoxalyltrimethylolpropane (TETMP).

TABLE 2

| Curing agent (weight) | Amount of the polyol | Acetone 130° C. | rubbing test[4] 150° C. |
|---|---|---|---|
| TETMP (0.91 g) | 4.39 g | 9 | 22 |
| HEODPE (0.89 g) | 4.43 g | 8 | 10 |

[4]A piece of cloth which was saturated with acetone was wrapped on a finger and rubbed on the cured coating. Number of times until the coating is peeled off is shown in Table 2.

EXAMPLE 9

A two liter flask equipped with a stirrer, a condenser, a decanter and an inlet for nitrogen gas was charged with 200 g of PLACCEL 303 (a trifunctional polyol having OH value 538.2, acid value 0.54, Mn(GPC) 640; available from Daisel Chemical Industries Co., Ltd.), 1402 g of diethyl oxalate and 2 g of dibutyltin dilaurate; and mixed at 120° to 130° C. for 6 hours, during which 95.0 g of a mixture of ethanol and diethyl oxalate was distilled away. The reaction mixture was cooled and then excess amount of diethyl oxalate was removed using an evaporator to obtain 401 g of ethoxalated PLACCEL 303 (yield 103%). It was a light brown milky liquid and had a viscosity of 451 CP, a nonvolatile content of 89% and Mn (GPC) of 1,010.

EXAMPLES 10 to 14

Different PLACCEL as shown in Table 3 was employed and ethoxalation reaction was conducted as generally described in Example 8 in the conditions as shown in Table 4. Table 4 also shows the characteristics of the ethoxalated compound.

TABLE 3

| Example | PLACCEL number | Functional number | OH value | Acid value | Mn (GPC) |
|---|---|---|---|---|---|
| 10 | 305 | 3 | 307.5 | 0.66 | 990 |
| 11 | 308 | 3 | 197.2 | 0.60 | 1550 |
| 12 | 489 | 4 | 462.0 | 0.72 | 920 |
| 13 | 574 | 4 | 313.8 | 0.83 | 1230 |
| 14 | 688 | 6 | 274.2 | 1.50 | 1940 |

TABLE 4

| Example No. | PLACCEL (g) | Diethyl oxalate (g) | Reaction temp. (°C.) | Reaction time (hr) | Distilled ether (g) | Product (g) | Yield (%) | Mn (GPC) | Nonvolatile content (wt %) | Viscosity (CP) | Appearance |
|---|---|---|---|---|---|---|---|---|---|---|---|
| 10 | 350 | 1402 | 127 | 7 | 93.6 | 553 | 102 | 986 | 92.1 | 576 | Milky white |
| 11 | 400 | 1022 | 125 | 5 | 66.6 | 700 | 100 | 1434 | 95.3 | 778 | Milky white |
| 12 | 243 | 1460 | 123 | 8 | 101.1 | 447 | 101 | 921 | 96.9 | 1869 | Milky white |
| 13 | 357 | 1461 | 125 | 7 | 86.5 | 546 | 98 | 1230 | 94.2 | 1725 | Milky white |
| 14 | 409 | 1461 | 126 | 4 | 106.0 | 641 | 99 | 1942 | 96.4 | 4096 | Light brown Milky white |

EXAMPLE 15

A 3 liter flask equipped with a stirrer, a condenser, a decanter and an inlet for nitrogen gas was charged with 104.4 g of 1,3,5-trishydorxyethyl is isocyanurate having OH value 647, acid value 0.39 and molecular weight 261, 2631 g of diethyl oxalate and 2.1 g of dibutyltin dilaurate, and mixed at 100° C. for 3 hours in a nitrogen atmosphere, during which 19 g of a mixture of ethanol and diethyl oxalate was distilled away. The reaction mixture was colled and then excess amount of diethyl oxalate was removed using evaporator to obtain 560 g of 1,3,5-trishydroxyethyl isocyanurate (yield 100%). It was a white solid and had a nonvolatile content of 98.3% and Mn (GPC) of 760.

EXAMPLE 16

A 2liter flask equipped with a stirrer, a dropping funnel and a condenser was charged with a solution of 190 g of an epoxy resin having Mw 380 and epoxy equivalent 189 (EP-828 available from Yuka Shell Company) and 130 g of methyl ethyl ketone, and heated to 50° C. To the content, a solution of 105 g (1 mol) of diethanolamine in 100 ml of acetone was added dropwise for 30 minutes. After completion of dropping, it was heated to 70° C. at which the reaction started and exothermed to 78° C. Mixing was then continued for 3 hours and the reaction ws terminated when IR spectrum showed that the absorption of an epoxy group disappeared.

Next, after distilling off methyl ethyl ketone and acetone, 1460 g of diethyl oxalate and 1.9 g of dibutyltin dilaurate were added and heated to 100° C. The mixing was continued for 8 hours with distilling ethanol off. The reaction was terminated when 65 ml of ethanol was distilled off. Excess amount of diethyl oxalate was removed under a reduced pressure to obtain 592 g of an ethoxalated epoxy resin.

EXAMPLE 17

A 2 liter flask equipped with a stirrer, a dropping funnel and a condenser was charged with a solution of 300 g of an epoxy resin having Mw 900 and epoxy equivalent 450 (EP-1001 available from Yuka shell Company) and 130 g of methyl ethyl ketone, and heated to 50° C. To the content, a solution of 50 g (0.667 mol) of diethanolamine in 100 ml of acetone was added dropwise for 30 minutes. After completion of dropping, it was heated to 100° C. at which the reaction started and exothermed to 120° C. Mixing was then continued for 3 hours and the reaction was terminated when the IR spectrum showed that the absorption of an epoxy group disappeared.

Next, after distilling off methyl ethyl ketone and acetone, 1168 g of diethyl oxalate and 3.0 g of dibutyltin dilaurate were added and heated to 120° C. The mixture was continued for 8 hours with distilling ethanol off. The reaction was terminated when ethanol was distilled off. Excess amount of diethyl oxalate was removed under a reduced pressure to obtain 719 g of an ethoxalated epoxy resin having a molecular weight of 3,187 (GPC).

REFERENCE EXAMPLE 4

Preparation of monoethyl oxalate

A reaction flask equipped with a condenser, a thermometer and a stirrer was charged with 1,461 g (1.0 mol) of diethyl oxalate, 4.38 g of p-toluenesulfonic acid and 400 ml of dioxane, and refluxed for 4 hours. Then, it was distilled at a reduced pressure to obtain 133.4 g of monoethyl oxalate having a boiling point of 107° C./12 mmHg.

EXAMPLE 18

A 2 liter flask equipped with a stirrer, a dropping funnel and a condenser was charged with a solution of 133 g of an epoxy resin having Mw 380 and epoxy equivalent 189 (EP-828 available from Yuka Shell Company) and 70 g of methyl ethyl ketone, 73.5 g of toluene, 1.1 g of dimethylbenzylamine and mixed at room temperature. To the content, 82.6 g of monoethyl oxalate was added dropwise for 60 minutes. The reaction mixture exothermed to 80° C. Refluxing was continued for 4 hours and the reaction was terminated whtn IR spectrum showed that the absorption of a carboxyl group disappeared. Methyl ethyl ketone and acetone were distilled off to obtain an ethoalated epoxy resin.

EXAMPLE 20

A 200 ml flask equipped with a stirrer, a dropping funnel and a condenser was charged with 35,8 g of an aliphatic epoxy compound (ERL-4221 available from Union Carbide Co., Ltd.), 30 g of toluene and 0.315 of dimethylbenzylamine, and mixed at room temperature. To the content, a solution of 41.3 g of monoethyl oxalate in 70 g of toluene was added dropwise for 60 minutes. The reaction mixture exothermed a little. Refluxing was continued for 3 hours and the reaction was terminated when IR spectrum showed that the absorption of a carboxyl group disappeared. Methyl ethyl ketone and acetone were distilled off to obtain 64.4 g of an ethoxalated epoxy resin.

What is claimed is:

1. A poly (alpha-ketoester) compound represented by the formula (1);

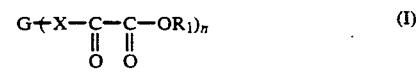

wherein G is a residue of an active hydrogen-containing compound $G-(X-H)_n$, or an alkyl, aryl, aralkyl, alkenyl, alkynyl group having 3 to 20 carbon atoms which may contain oxygen or nitrogen atoms, or a polymeric compound residue, X is a oxygen atoms or $-CH_2-$, n is an integer of 3 to 1,000, $R_1$ is a hydrogen atom, A $C_1-C_5$ alkyl group or an aryl group.

2. The poly(alpha-ketoester) compound according to claim 1 wherein said X is an oxygen atom.

3. The poly(alpha-ketoester) compound according to claim 1 wherein said X is an oxygen atom and said polymeric compound residue of G is a polyhydric alcohol residue.

4. The poly(alpha-ketoester) compound according to claim 1 wherein said X is an oxygen atom and said polymeric compund residue of G is a polyester polyol residue.

5. The poly(alpha-ketoester) compound according to claim 1 wherein said X is an oxygen atom and said polymeric compound residue of G is a polyether polyol residue.

6. The poly(alpha-ketoester) compound according to claim 1 wherein said X is an oxygen atom and said polymeric compound residue of G is a polyurethane polyol residue.

7. The poly(alpha-ketoester) compound according to claim 1 wherein said X is an oxygen atom and said polymeric compound residue of G is a ring opened epoxy resin residue.

8. The poly(alpha-ketoester) compound according to claim 1 wherein said X is an oxygen atoma and said polymeric compound residue of G is a polyvinyl alcohol residue.

9. The poly(alpha-ketoester) compound according to claim 1 wherein said X is an oxygen atom and said polymeric compound residue of G is an amino resin residue.

10. The poly(alpha-ketoester) compound according to claim 1 wherein said X is an oxygen atom and said polymeric compound residue of G is a phenol resin residue.

11. The poly(alpha-ketoester) compound according to claim 1 wherein said X is an oxygen atom and said polymeric comound residue of G is a hydroxy-containing polybutadiene residue.

12. The poly(alpha-ketoester) compound according to claim 1 wherein said X is an oxygen atom and said polymeric compound residue of G is a hydroxy-containing polychloroprene residue.

13. Triethoxalyltrimethylolpropane.

14. Tetraethoxalylpentaerythritol.

15. A process for preparing the poly(alpha-ketoester) compound according to claim 1, which comprises reacting an active hydrogen-containing compound (II);

$$G\!-\!\!-\!(-X\!-\!H)_n$$

[wherein G, X and n is the same as mentioned above.] with an ester compound (III);

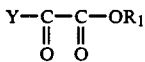

[wherein Y is a halogen atoma or $R_fO$, $R_f$ is the same as mentioned above].

16. The process according to claim 15 wherein said active hydrogen-containing compound (II) is a polyhydric alcohol.

17. The process according to claim 15 wherein said ester compound (III) is an oxalic diester.

18. The process according to claim 15 wherein said ester compound (III) is an alkoxalyl halide.

* * * * *